(12) United States Patent
Mathieson et al.

(10) Patent No.: US 8,382,052 B1
(45) Date of Patent: Feb. 26, 2013

(54) FLAT-SCREEN TELEVISION MOUNTING METHODS AND APPARATUS

(76) Inventors: Michael Mathieson, Decatur, IL (US); Mark A. Krull, Bend, OR (US)

(*) Notice: Subject to any disclaimer, the term of this patent is extended or adjusted under 35 U.S.C. 154(b) by 811 days.

(21) Appl. No.: 11/973,638

(22) Filed: Oct. 9, 2007

Related U.S. Application Data

(60) Provisional application No. 60/850,525, filed on Oct. 10, 2006.

(51) Int. Cl.
| | |
|---|---|
| *A47G 29/02* | (2006.01) |
| *E04G 3/20* | (2006.01) |
| *E06B 7/28* | (2006.01) |
| *F16M 11/00* | (2006.01) |
| *A47H 1/10* | (2006.01) |
| *H04N 5/64* | (2006.01) |
| *A47B 5/00* | (2006.01) |

(52) U.S. Cl. .................. 248/240; 248/202.1; 248/240.1; 248/323; 248/324; 248/284.1; 348/794; 348/836; 348/825; 312/7.2

(58) Field of Classification Search ............. 248/231.91, 248/240, 240.1, 202.1, 919, 917, 317, 323, 248/324, 234, 291.1, 922, 923, 920, 918, 248/921, 284.1, 296.1; 348/794, 836, 825; 312/7.2, 204; 361/679.01
See application file for complete search history.

(56) References Cited

U.S. PATENT DOCUMENTS

| | | | | |
|---|---|---|---|---|
| 4,691,886 | A * | 9/1987 | Wendling et al. | 248/183.1 |
| 5,125,610 | A * | 6/1992 | Queau | 248/284.1 |
| 5,826,357 | A * | 10/1998 | Hechler | 40/428 |
| 5,876,008 | A * | 3/1999 | Sweere et al. | 248/325 |
| 6,134,103 | A * | 10/2000 | Ghanma | 361/679.05 |
| 6,209,974 | B1 * | 4/2001 | Goto et al. | 312/7.2 |
| 6,484,993 | B2 * | 11/2002 | Huffman | 248/323 |
| 6,665,175 | B1 * | 12/2003 | deBoer et al. | 361/679.06 |
| 7,337,024 | B1 * | 2/2008 | Graham | 700/79 |
| 7,546,745 | B2 * | 6/2009 | Lee et al. | 62/125 |
| 7,663,706 | B2 * | 2/2010 | Ryu | 348/836 |
| 2001/0020810 | A1 * | 9/2001 | Kennedy | 312/223.3 |
| 2001/0055196 | A1 * | 12/2001 | Anzai et al. | 361/681 |
| 2005/0152109 | A1 * | 7/2005 | Choi et al. | 361/683 |
| 2005/0168661 | A1 * | 8/2005 | Maxson | 348/825 |
| 2006/0118694 | A1 * | 6/2006 | Lee et al. | 248/923 |
| 2007/0023599 | A1 * | 2/2007 | Fedewa | 248/284.1 |
| 2007/0058092 | A1 * | 3/2007 | Ryu | 348/836 |
| 2009/0109352 | A1 * | 4/2009 | Lewis et al. | 348/837 |

FOREIGN PATENT DOCUMENTS

GB      2412061 A  *  9/2005

* cited by examiner

*Primary Examiner* — Terrell McKinnon
*Assistant Examiner* — Christopher Garft

(57) ABSTRACT

A flat-screen television is movably mounted on a wall for movement between a first position, disposed above a fireplace, and a second position, disposed in front of a least part of the fireplace.

16 Claims, 12 Drawing Sheets

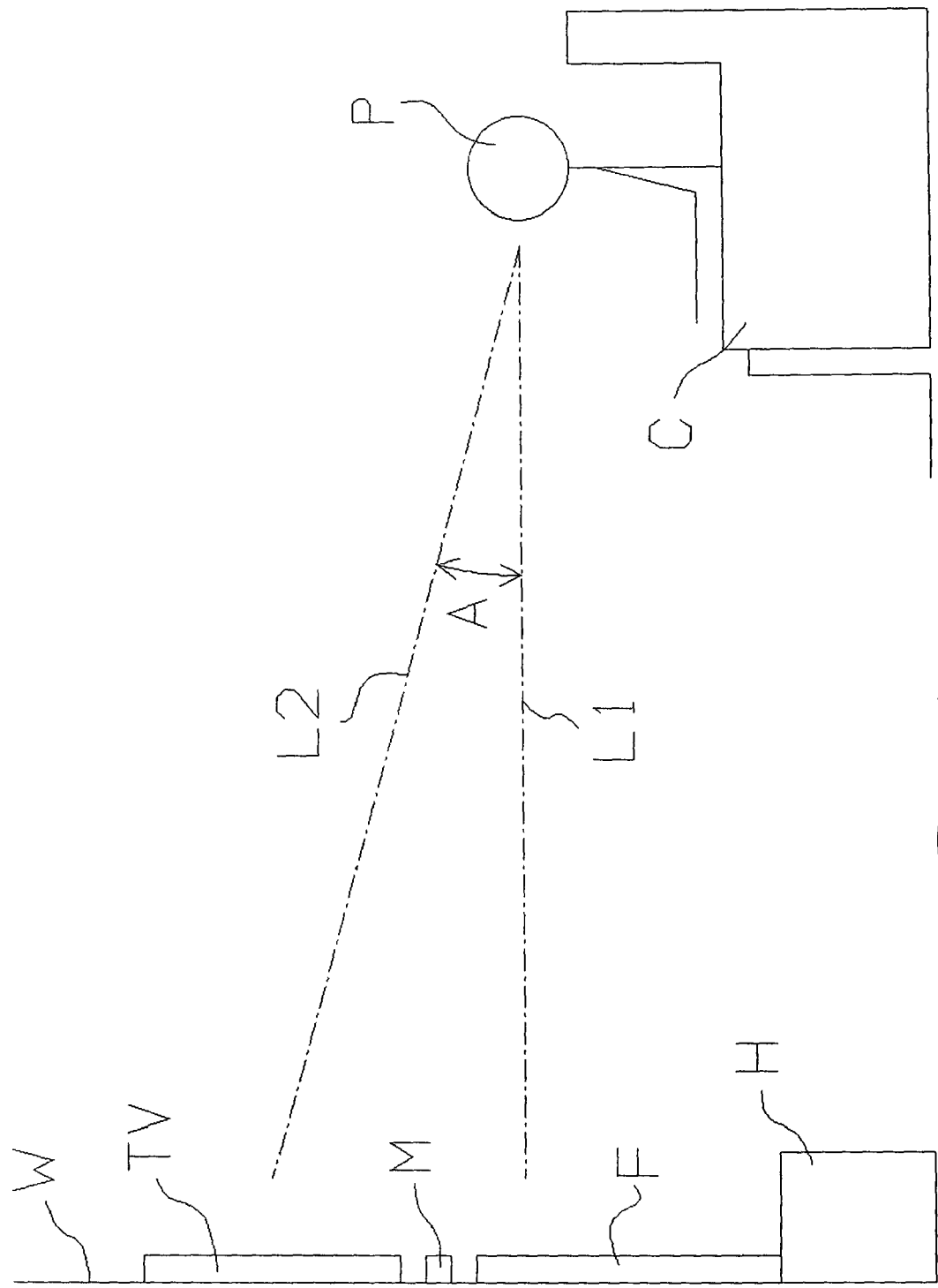

FLAT-SCREEN TELEVISION MOUNTING METHODS AND APPARATUS

CROSS-REFERENCE TO RELATED APPLICATIONS

Disclosed herein is subject matter that is entitled to the filing date of U.S. Provisional Application No. 60/850,525, filed Oct. 10, 2006.

FIELD OF THE INVENTION

The present invention relates to television mounting techniques, and in a preferred application, to methods and apparatus for movably supporting a flat-screen television relative to a wall containing a fireplace.

BACKGROUND OF THE INVENTION

FIG. 1 shows a person P sitting on a chair or couch C in a room bounded by a wall W across from the person P. A hearth H projects outward from the wall W and into the room. A fireplace F is disposed within the wall W above the hearth H. A mantle M is secured to the wall W above the fireplace F, and a flat-screen television TV is attached to the wall W above the mantle M.

A first line of sight L1 extends perpendicular to the wall W and aligns with the eyes of the seated person P. A second line of sight L2 extends from the eyes of the seated person P toward the approximate center of the television TV. An angle A is defined between the lines L2 and L1. A commercially significant number of people experience discomfort when required to watch television along the second line of sight L2. Accordingly, it is an object of the present invention to reduce and/or eliminate the angle A during television viewing, while nonetheless accommodating storage of a television above a fireplace as shown in FIG. 1.

SUMMARY OF THE INVENTION

The present invention provides methods and apparatus for supporting a flat-screen television in at least two discrete positions relative to a fireplace (or another similarly situated room feature, such as an aquarium). In one position, the television is disposed above the fireplace, thereby accommodating conventional viewing and enjoyment of the fireplace. In another position, the television is disposed in front of at least part of the fireplace, thereby accommodating conventional viewing and enjoyment of the television (at a preferred viewing angle). Many features and/or advantages of the present invention will become apparent from the more detailed description that follows.

BRIEF DESCRIPTION OF THE FIGURES OF THE DRAWING

With reference to the Figures of the Drawing, wherein like reference characters represent like parts and assemblies throughout the several views, FIG. 1 is a diagrammatic side view of a room wherein a fireplace and a flat-screen television are arranged in a conventional fashion;

DETAILED DESCRIPTION OF A PREFERRED EMBODIMENT

Figure 2A:
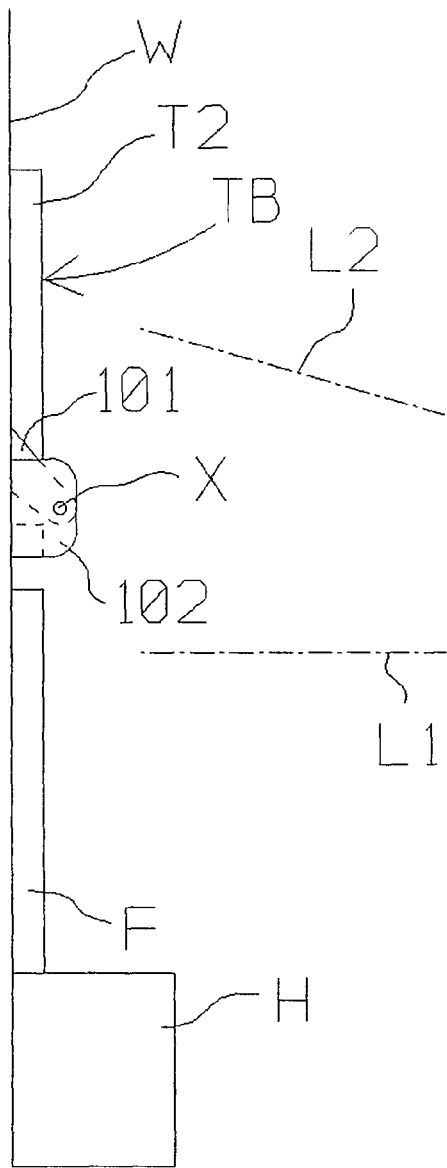
FIG. 2a is a diagrammatic side view of a room similar to that shown in FIG. 1, but with the television movably mounted on the wall in accordance with the principles of the present invention, and occupying a first position, disposed above the fireplace.
Figure 2B:
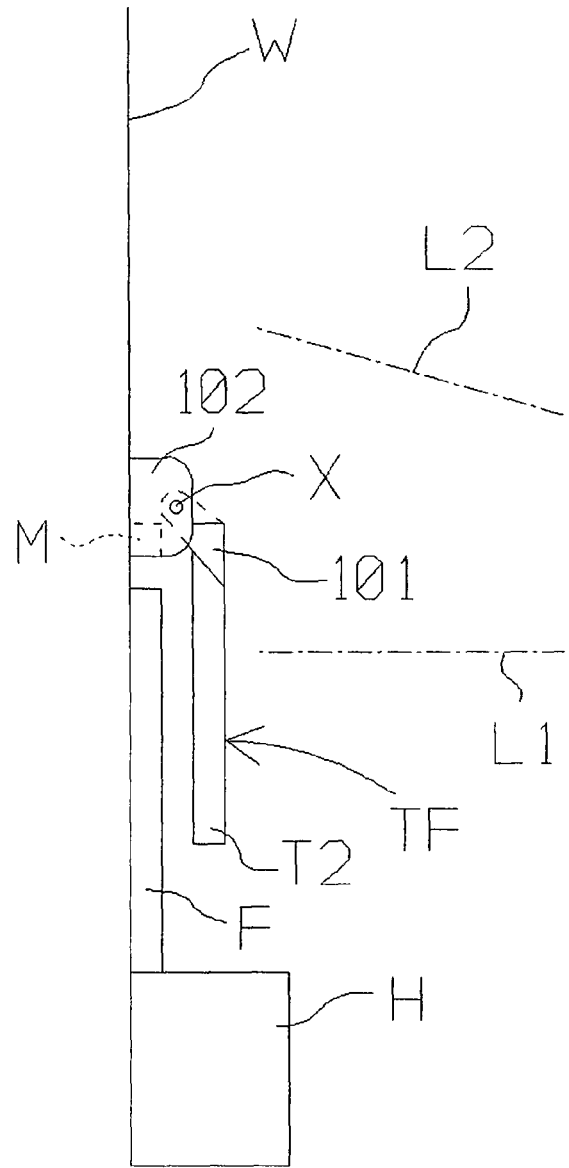
FIG. 2b is a diagrammatic side view of the room and television mounting arrangement of FIG. 2a, with the television moved to a second position, disposed in front of the fireplace.

As suggested by the common reference characters, FIGS. 2a-2b show part of a room that is similar to that shown in FIG.

1, but with a flat-screen television T2 movably mounted on the wall W in accordance with the principles of the present invention. More specifically, a generally U-shaped television bracket 101 is configured to span the television T2, and is attached across the upper end thereof (using bolts or other suitable means) in such a manner that left and right bracket tabs project upward and rearward from respective sides thereof (the television T2 is "right side up" in FIG. 2b). Left and right wall brackets 102 are attached to the wall W outside respective ends of the mantle M. The tabs on the television bracket 101 are pivotally connected to respective wall brackets 102 by nuts and bolts (or other suitable means).

In FIG. 2a, the line of sight L1 extends horizontally and unobstructed from the eyes of the seated person P to an upper portion of the fireplace F, and the line of sight L2 extends from the eyes of the seated person P (shown in FIG. 1) toward the approximate center of the television T2 (at angle A relative to line L1). When the television T2 is so arranged, the back side TB of the television T2 is in full view, and is preferably shrouded by an appropriately sized piece of art (or otherwise made to be aesthetically pleasing). The television T2 is rotated 180 degrees about the pivot axis X to move from the position shown in FIG. 2a to the position shown in FIG. 2b.

In FIG. 2b, the line of sight L1 extends horizontally and unobstructed from the eyes of the seated person P to the approximate center of the screen or front TF of the television T2. In each position, the weight of the television T2 is "over center" relative to the pivot axis X, thereby encouraging the television T2 to remain as shown. Stops are preferably provided on the brackets 101 and/or 102 to prevent the television T2 from pivoting further toward the fireplace F, and torsion springs may be interconnected between the brackets 101 and 102 (in a manner known in the art) to resist pivoting of the television T2 from the FIG. 2a position to the FIG. 2b position, and/or to assist pivoting of the television T2 from the FIG. 2b position to the FIG. 2a position.

Figure 3B:
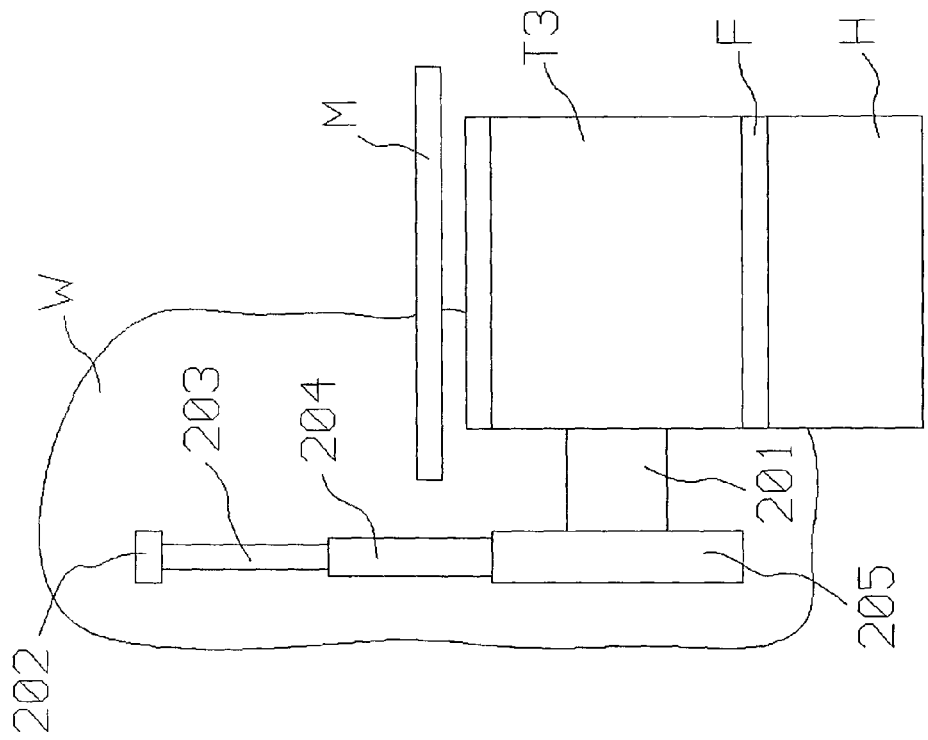
FIG. 3b is a diagrammatic front view of the room and television mounting arrangement of FIG. 3a, with the television moved to a second position, disposed in front of the fireplace.
Figure 3A:
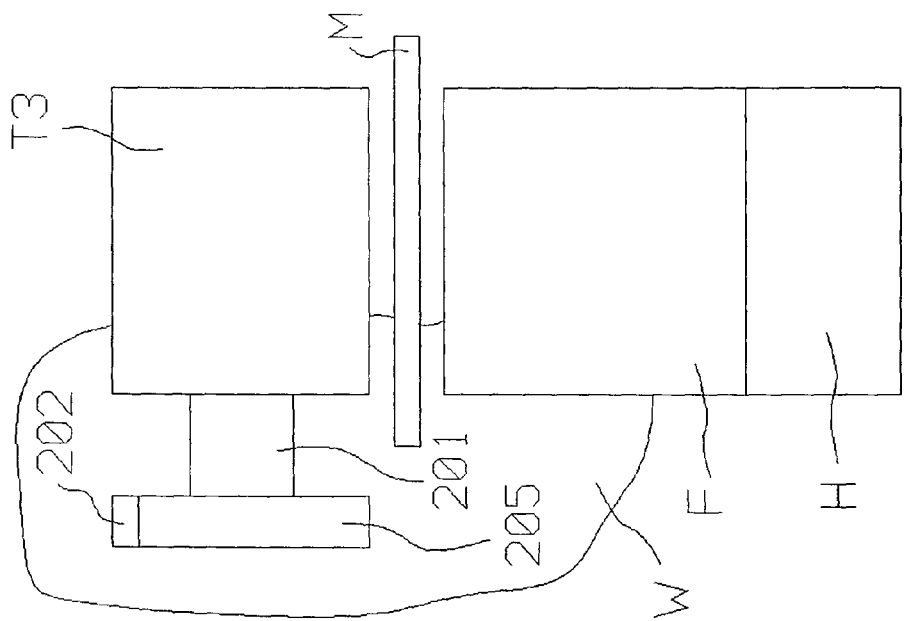
FIG. 3a is a diagrammatic front view of a wall in a room similar to that shown in FIG. 1, but with the television movably mounted on the wall in another manner consistent with the principles of the present invention, and occupying a first position, disposed above a fireplace.

As suggested by the common reference characters, FIGS. 3a-3b show (from a different perspective) part of a room that is similar to that shown in FIG. 1, but with a flat-screen television T3 movably mounted on the wall W in accordance with the principles of the present invention. More specifically, a television bracket or plate 201 is attached to the back side (not shown) of the television T3 (using bolts or other suitable means), and projects outward beyond a side thereof. The television bracket 201 is secured to a cylinder 205 by welding (or other suitable means). The cylinder 205 is movably mounted on a relatively smaller cylinder 204, which in turn, is movably mounted on a rod 203. A wall bracket 202 is rigidly interconnected between the rod 203 and the wall W. The components 203-205 are configured and arranged to accommodate rotational movement and telescoping movement relative to one another.

In FIG. 3a, the horizontal line of sight (designated as L1 in FIG. 1) intersects the same upper portion of the fireplace F, and the other line of sight (designated as L2 in FIG. 1) intersects the approximate center of the television T3. The television T3 may be viewed when so arranged, if desired. If not, the television T3 is movable to the position shown in FIG. 3b by pivoting it away from the wall W (about a vertical axis defined by the longitudinal axes of the components 203-205), and then lowering it (by telescoping the components 203-205). The television T3 may thereafter be rotated back toward the fireplace F, as well, to place the screen in a perpendicular orientation relative to the horizontal line of sight.

In FIG. 3b, the horizontal line of sight (designated as L1 in FIG. 1) extends horizontally and unobstructed from the eyes of the seated person P to the approximate center of the screen on the television T3. Persons skilled in the art will recognize that springs and/or dampers may be incorporated into the telescoping components 203-205 (in a manner known in the art) to resist lowering of the television T3 from the FIG. 3a position to the FIG. 3b position, and/or to assist raising of the television T3 from the FIG. 3b position to the FIG. 3a position. Moreover, any of several known locking arrangements may be incorporated into the telescoping components 203-205 to selectively secure the television T3 in either position, and/or the mantle M and/or the hearth H may be used to support the television T3 in a respective position.

Figure 4A:
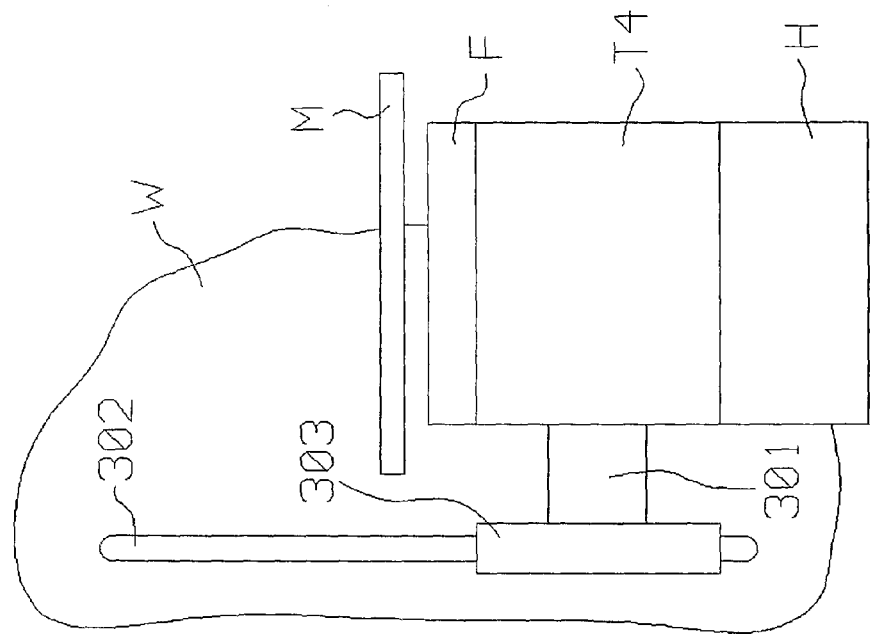
FIG. 4a is a diagrammatic front view of a wall in a room similar to that shown in FIG. 1, but with the television movably mounted on a wall in yet another manner consistent with the principles of the present invention, and occupying a first position, disposed above the fireplace.
Figure 4B:
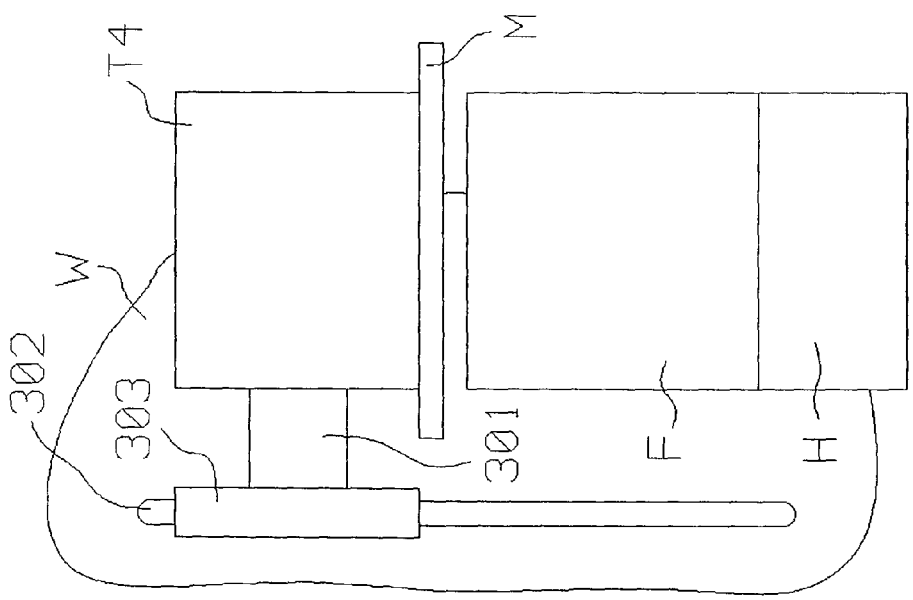
FIG. 4b is a diagrammatic front view of the room and television mounting arrangement of FIG. 4a, with the television moved to a second position, disposed in front of the fireplace.

FIGS. 4a-4b show yet another television mounting arrangement constructed according to the principles of the present invention (and showing how the mantle M and the hearth H may be used as noted in the preceding paragraph). As suggested by the common reference characters, FIGS. 4a-4b show (from a different perspective) part of a room that is similar to that shown in FIG. 1, but with a flat-screen television T4 movably mounted on the wall W in accordance with the principles of the present invention. More specifically, a television bracket or plate 301 is attached to the back side (not shown) of the television T4 (using bolts or other suitable means), and projects outward beyond a side thereof. A wall bracket or generally U-shaped cylindrical rod 302 has upper and lower ends that are rigidly connected to the wall W. A cylinder 303 is movably mounted on the wall bracket 302 and secured to the exposed end of the television bracket 301 by welding (or other suitable means). The cylinder 303 is configured and arranged to rotate about and slide along the rod 302.

In FIG. 4a, the horizontal line of sight (designated as L1 in FIG. 1) intersects an upper portion of the fireplace F, and the other line of sight (designated as L2 in FIG. 1) intersects the approximate center of the television T4. However, in this case, this other line of sight intersects a relatively higher portion of the television T4 (as compared to previous embodiments), because the television T4 is resting on top of the mantle M. The television T4 may be viewed when so arranged, if desired. If not, the television T4 is movable to the position shown in FIG. 4b by pivoting it away from the wall W (about a vertical axis defined by the longitudinal axis of the rod 302), and then lowering it along the rod 302. The television T4 may thereafter be rotated back toward the fireplace F, as well, to place the screen in a perpendicular orientation relative to the horizontal line of sight.

In FIG. 4b, the horizontal line of sight (designated as L1 in FIG. 1) extends horizontally and unobstructed from the eyes of the seated person P to the approximate center of the screen on the television T4. However, in this case, this horizontal line of sight intersects a relatively higher portion of the television T4 (as compared to previous embodiments), because the television T4 is resting on top of the hearth H. Depending on aesthetic and operational preferences, complementary structure may be provided on the television T4 and the mantle M and hearth H to bias and/or latch the television T4 in the respective positions shown in FIGS. 4a and 4b. Persons skilled in the art will also recognize that a one-way resistance arrangement and/or a ratchet mechanism may be interposed between the cylinder 303 and the rod 302 to limit downward movement of the former along the latter, and/or to facilitate incremental lifting of the former along the latter.

Figure 5:
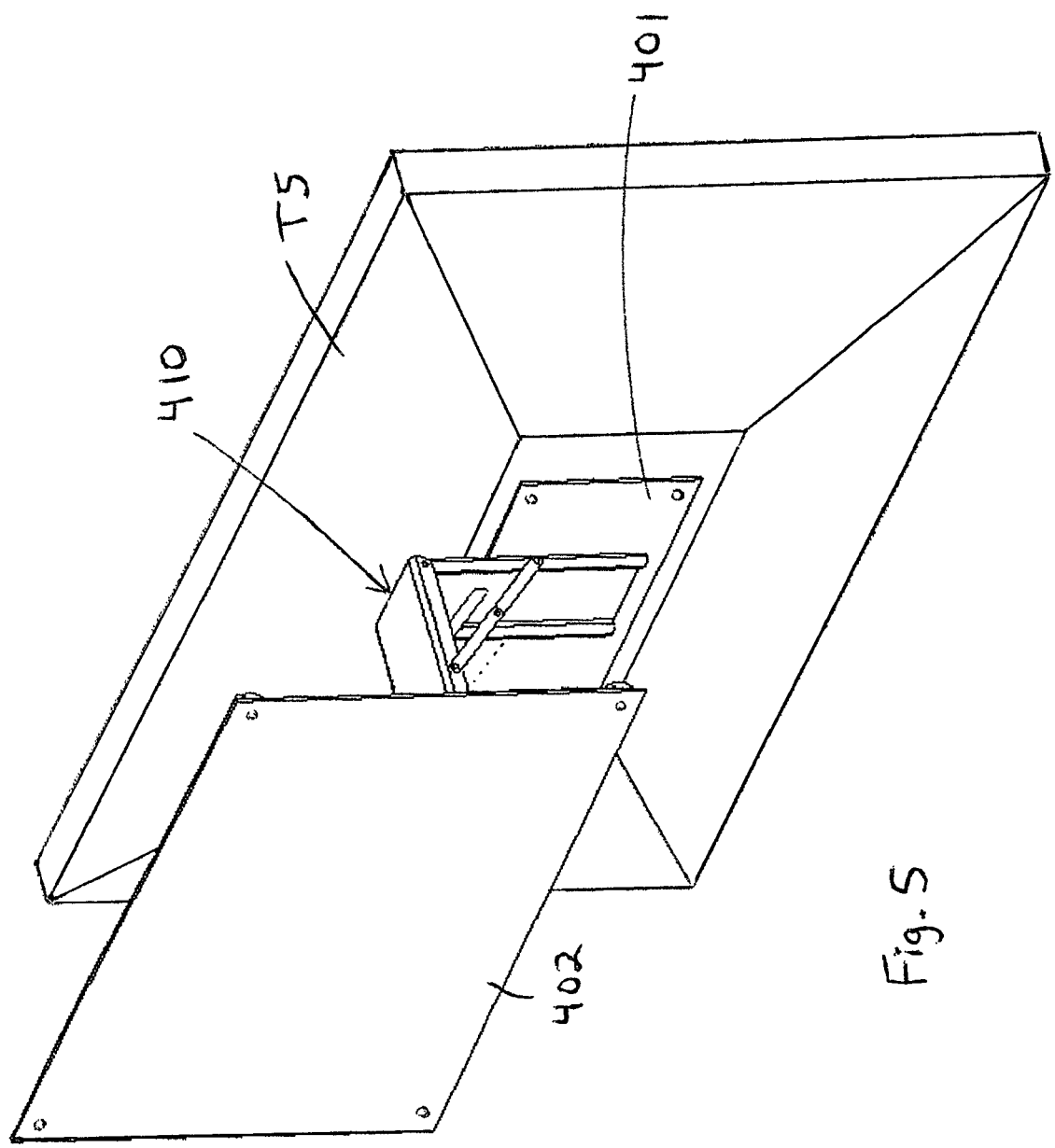
FIG. 5 is a rear perspective view of a flat-screen television and still another mounting arrangement consistent with the principles of the present invention.
Figure 6:
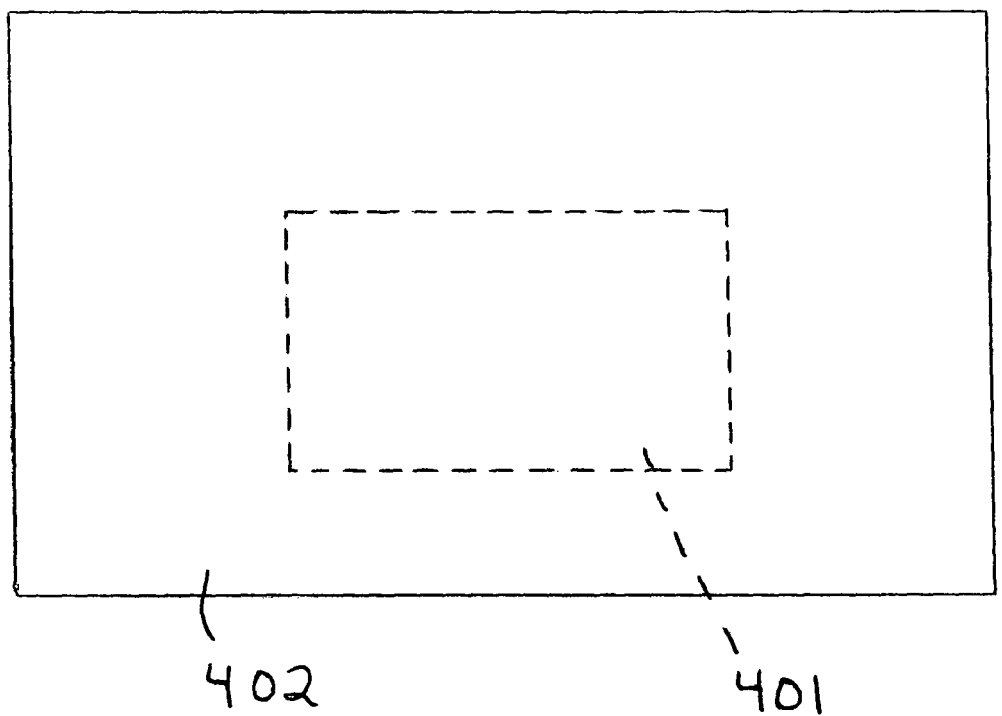
FIG. 6 is a front perspective view of the mounting arrangement of FIG. 5, showing the components in a fully retracted configuration (to support the television above the fireplace)
Figure 7:
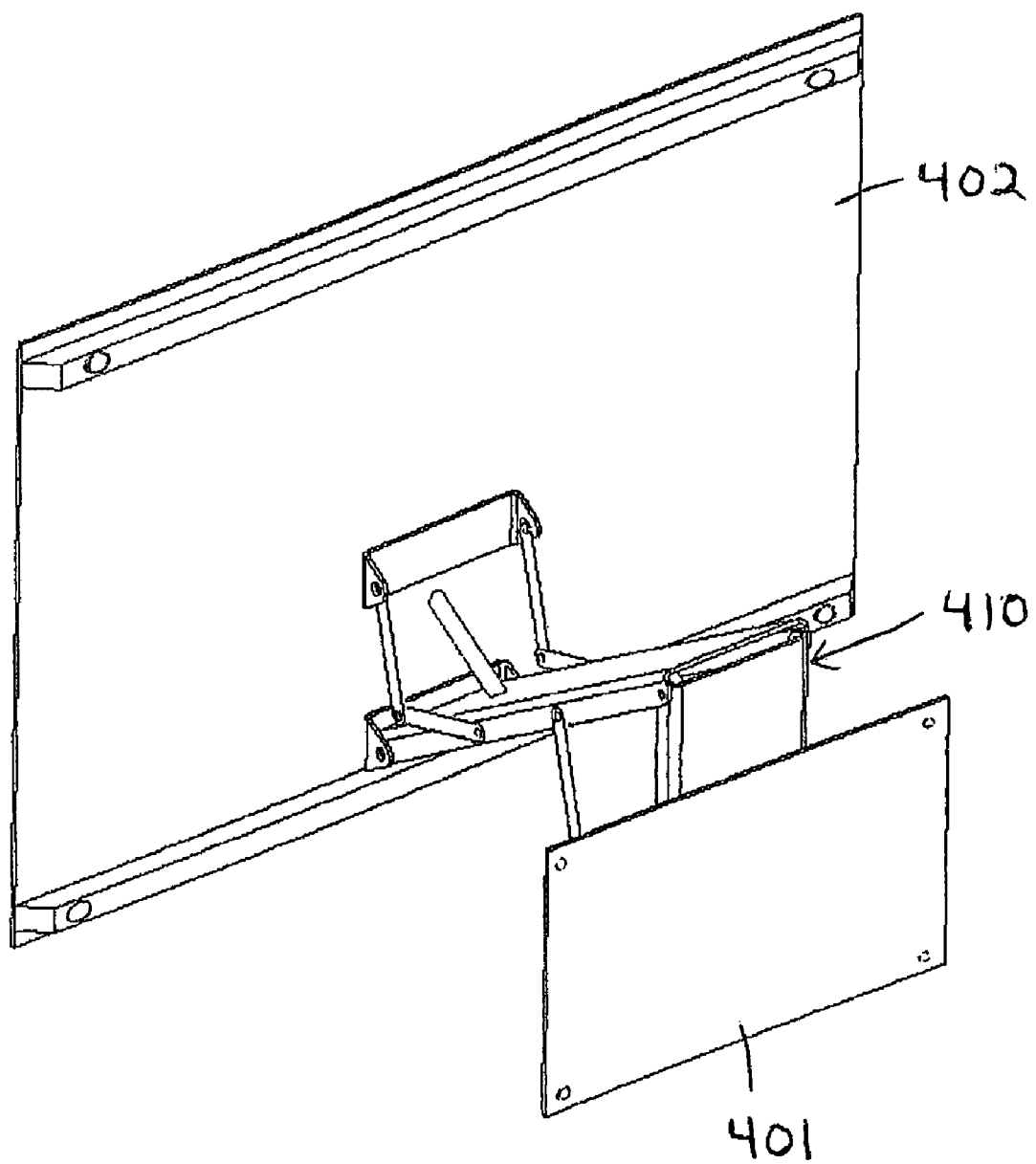
FIG. 7 is a comparable front perspective view of the mounting arrangement of FIG. 6, showing the components in a partially extended configuration.
Figure 8:
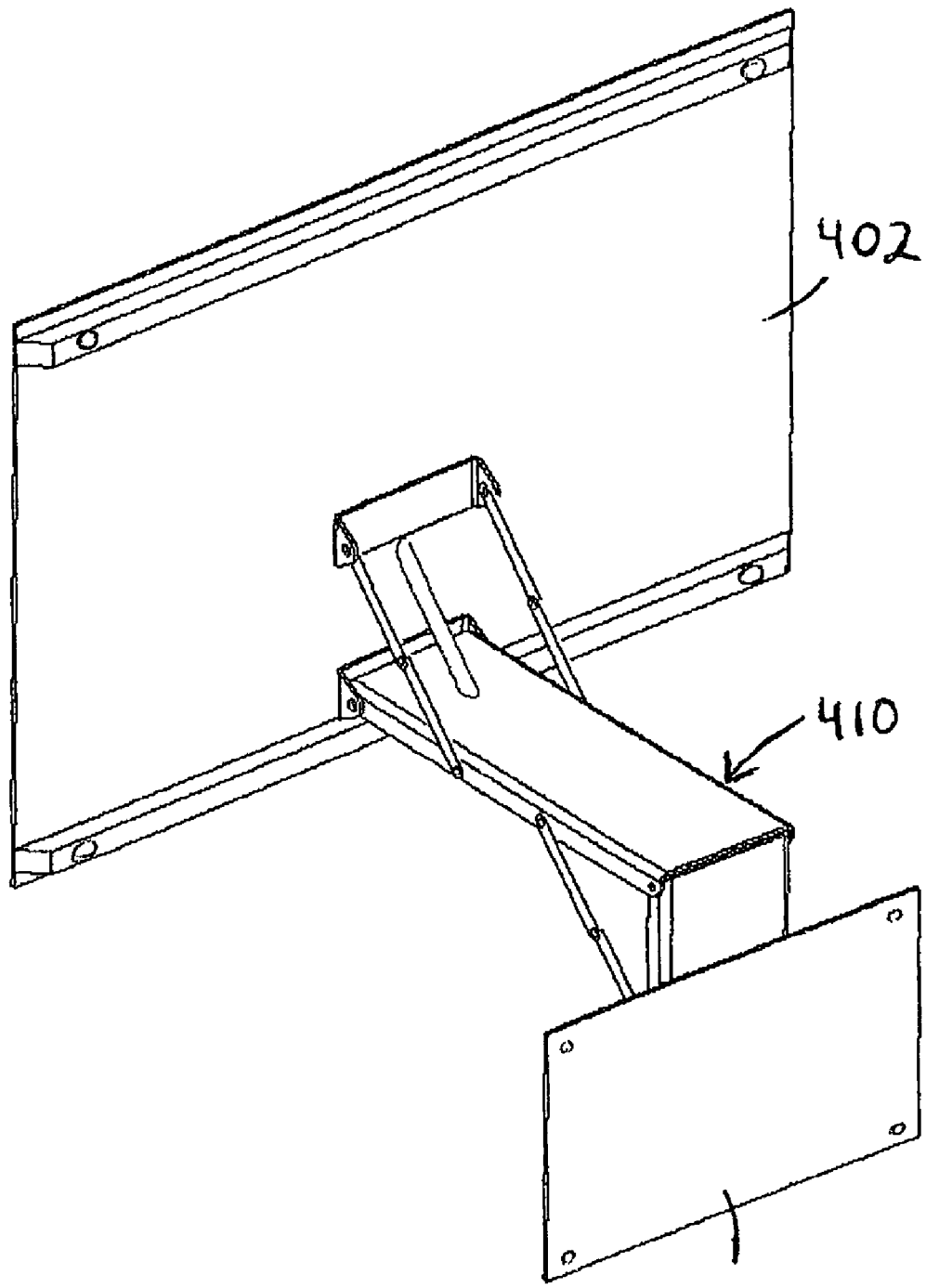
FIG. 8 is a comparable front perspective view of the mounting arrangement of FIG. 6, showing the components in a fully extended configuration (to support the television in front of at least part of the fireplace)

FIG. 5 shows yet another television mounting arrangement that is consistent with the principles of the present invention, and that is suitable for accommodating the same sort of repositioning of a flat-screen television relative to a fireplace or similarly situated room feature. A television bracket or plate 401 is attached to a 42" flat-screen plasma television T5 by bolts (or other suitable means). A relatively larger wall bracket or plate 402 is configured for attachment to a wall (by bolts or other suitable means), and a hinge assembly 410 is movably interconnected between the two brackets 401 and 402. As shown in FIGS. 6-8, peripheral frame members 408 are preferably provided along at least the upper and lower edges of the wall bracket 402 to define a space that is size and configured to receive the television T4.

Figure 9:
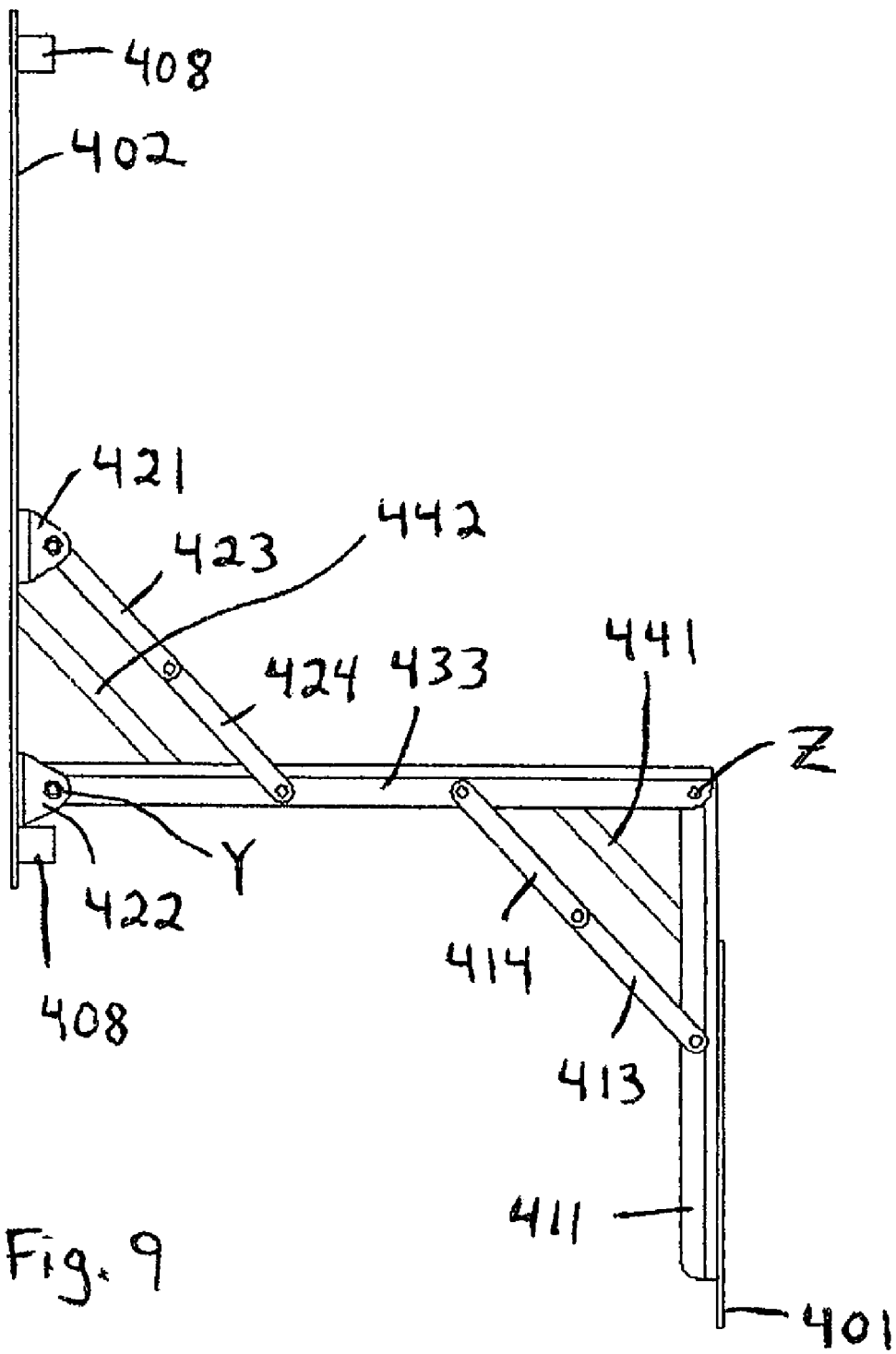
FIG. 9 is a side view of the mounting arrangement shown in FIG. 8.

The components of the hinge assembly 410 are labeled individually in FIG. 9. A first support arm or channel member 411 is rigidly secured to the television bracket 401 by welding (or other suitable means), and thus, these two parts may be collectively referred to as the television bracket. A second support arm or channel member 433 is pivotally connected to the wall bracket 402 via a trunnion member 422, thereby defining a pivot axis Y. A distal end of the second member 433 is pivotally connected to a distal end of the first member 411, thereby defining a pivot axis Z. First and second braces 413 and 414 are pivotally interconnected in series between an intermediate portion of the television bracket 401 and an intermediate portion of the second member 433. Similarly, first and second braces 423 and 424 are pivotally interconnected in series between an intermediate portion of the wall bracket 402 (via a trunnion member 421) and an intermediate portion of the second member 433. The braces 413 and 414 and 423 and 424 are configured and arranged to limit extension of the hinge assembly 410 to the extent shown in FIG. 9.

Biasing means or variable length members 441 and 442 are preferably provided to resist downward movement of the television bracket 401 relative to the wall bracket 402, and/or to assist upward movement of the television bracket 401 relative to the wall bracket 402. The biasing members 441 and 442 are preferably conventional parts, such as helical coil springs, air springs, frictional dampers, or some combination thereof. In the alternative, counter-weights may be used together with lever arms and/or cables and pulleys to offset the weight of the television.

FIG. 6 shows the hinge assembly 410 in a fully retracted configuration, with the television bracket 401 adjacent to the wall bracket 402 and disposed entirely within the perimeter of the wall bracket 402. FIG. 7 shows the hinge assembly 410 in a partially extended configuration, with the television bracket 401 separated from the wall bracket 402 and disposed in front of the lower end of the wall bracket 402. FIG. 8 shows the hinge assembly 410 in a fully extended configuration, with the television bracket 401 supported at a maximum available length from the wall bracket 402 and disposed entirely beneath the wall bracket 402. This maximum available length corresponds to the distance measured between the pivot axes Y and Z, which is fourteen inches on the depicted hinge assembly 410. This distance between the pivot axes Y and Z determines the maximum available downward travel of the television bracket 401, because the pivot axis Z rotates through an arc of 90 degrees about the pivot axis Y.

Figure 10C:
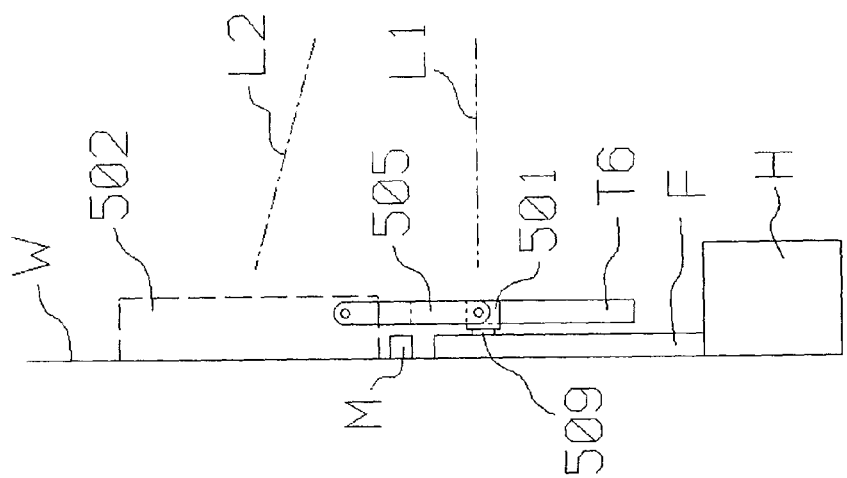
FIG. 10c is a diagrammatic side view of the room and television mounting arrangement of FIG. 10a, with the television occupying a lowermost position, disposed in front of the fireplace (relative to those shown in FIGS. 10a and 10b)
Figure 10B:
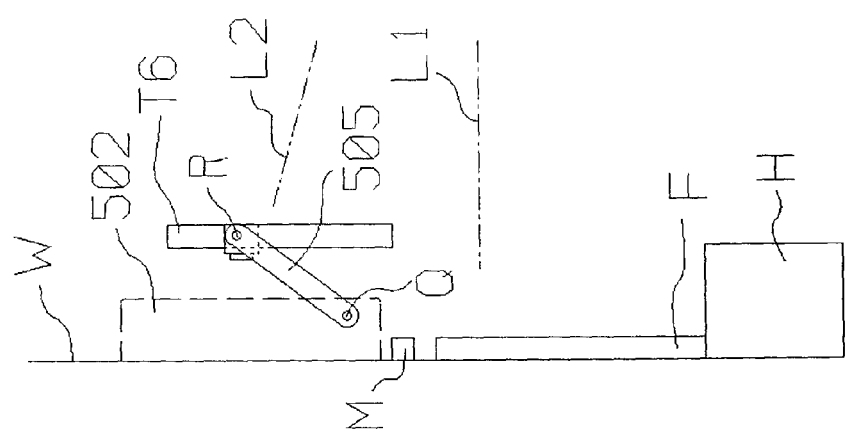
FIG. 10b is a diagrammatic side view of the room and television mounting arrangement of FIG. 10a, with the television occupying a transitional position.
Figure 10A:
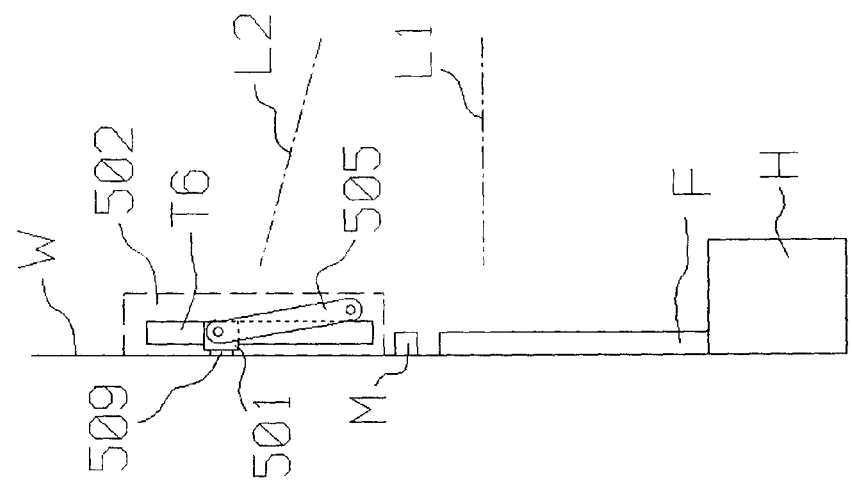
FIG. 10a is a diagrammatic side view of a room similar to that shown in FIG. 1, but with the television movably mounted on the wall in still another manner consistent with the principles of the present invention, and occupying a first position, disposed above the fireplace.

As suggested by the common reference characters, FIGS. 10a-10c show part of a room that is similar to that shown in FIG. 1, but with a flat-screen television T6 movably mounted on the wall W in accordance with the principles of the present invention. More specifically, a generally U-shaped television bracket 501 is configured to span the television T6, and is attached across the back thereof (using bolts or other suitable means) in such a manner that left and right bracket tabs project forward across respective sides thereof. Left and right support arms 505 have first ends that are pivotally connected to respective tabs on the television bracket 501, thereby defining pivot axis R. Opposite, second ends of the support arms 505 are pivotally connected to respective sides of a second bracket or wall bracket 502, thereby defining pivot axis Q. The wall bracket 502, which is shown as a box or cabinet in this particular arrangement, is secured to the wall W by screws or other conventional means.

In FIG. 10a, the line of sight L1 extends horizontally and unobstructed from the eyes of the seated person P to an upper portion of the fireplace F, and the line of sight L2 extends from the eyes of the seated person P toward the approximate center of the cabinet 502 (at angle A relative to line L1). When the television T6 is disposed within the cabinet 502, it may be exposed for viewing by the person P along the line of sight L2, or it may be hidden behind one or more optional doors on the cabinet 502. At least one bumper 509 may be mounted on the back side of the television bracket 501 to provide a cushion between the bracket 501 and the wall W (or an optional back wall on the cabinet 502). The support arms 505 are rotated approximately 190 degrees about the pivot axis Q, and the television T6 is rotated approximately 190 degrees about the pivot axis R, to move the television T6 from the position shown in FIG. 10a to the position shown in FIG. 10c. Slots are provided in the bottom of the cabinet 502 to provide clearance for the support arms 505.

In FIG. 10c, the line of sight L1 extends horizontally and unobstructed from the eyes of the seated person P to the approximate center of the television T6. In both the FIG. 10a position and the FIG. 10c position, the weight of the television T6 is stable relative to the pivot axis Q, thereby encouraging the television T6 to remain as shown in those figures. The at least one bumper 509 provides a cushion between the back of the bracket 501 and the front of the fireplace F. Various arrangements may be used to resist pivoting of the support arms 505 from the FIG. 10a position to the FIG. 10c position, and/or to assist pivoting of the support arms 505 from the FIG. 10c position to the FIG. 10a position. For example, springs may be interconnected between the support arms 505 and the cabinet 502 (in a manner known in the art) to urge the former upward toward the latter.

Figure 11B:
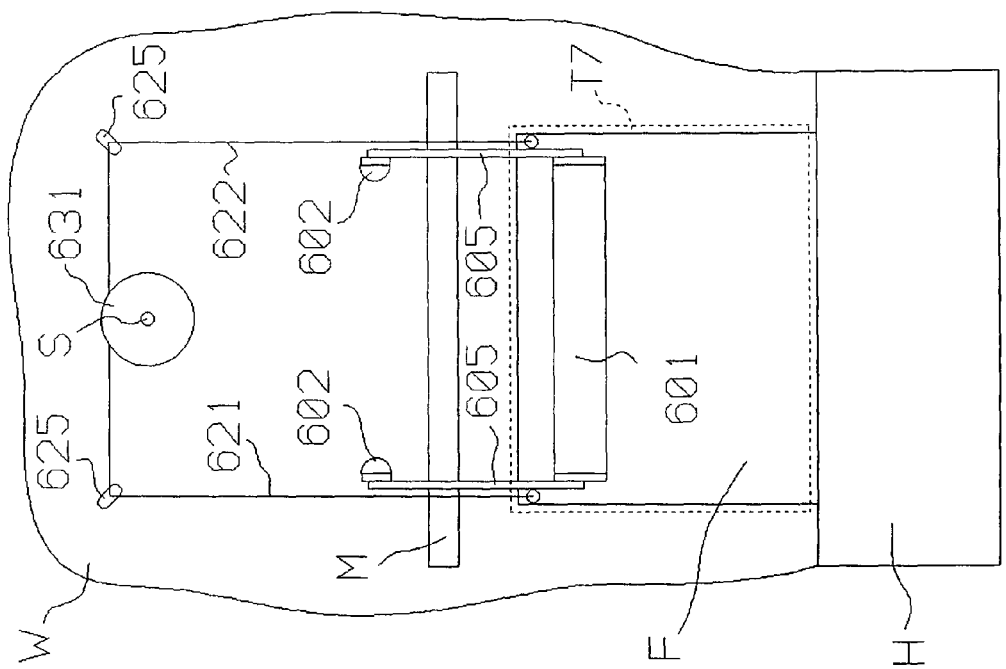
FIG. 11b is a diagrammatic front view of the room and television mounting arrangement of FIG. 11a, with the television moved to a second position, disposed in front of the fireplace.
Figure 11A:
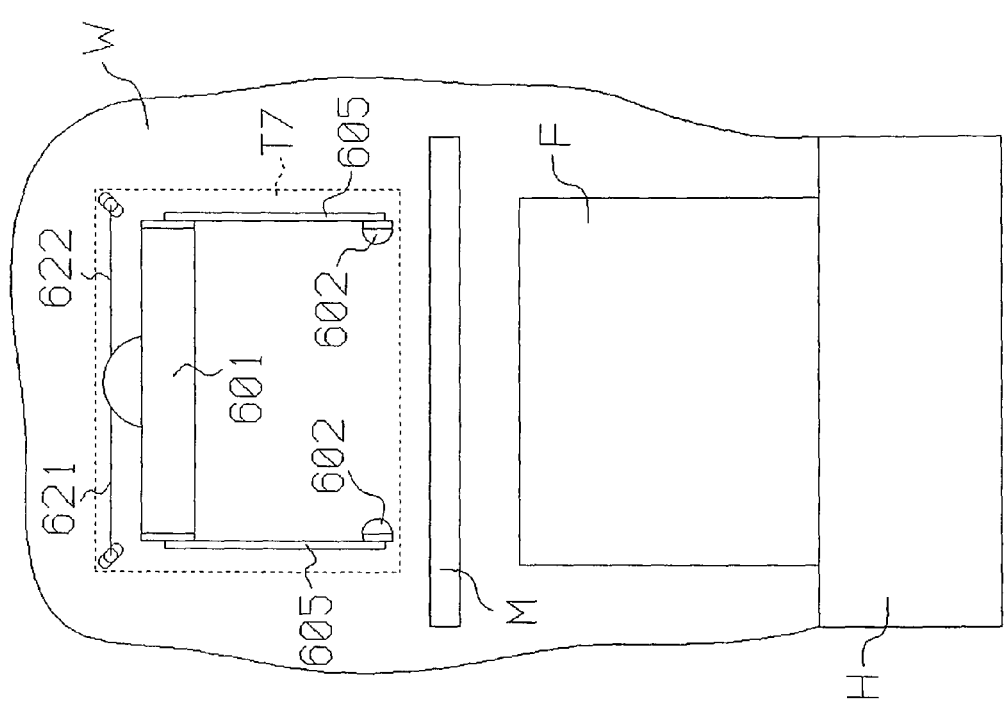
FIG. 11a is a diagrammatic front view of a room similar to that shown in FIG. 1, but with the television (shown in dashed lines) mounted on the wall in still another manner consistent with the principles of the present invention, and occupying a first position disposed above the fireplace.

FIGS. 11a-11b show still another television mounting arrangement constructed according to the principles of the present invention (and showing another way to bias the television toward an upper position relative to the fireplace F). As suggested by the common reference characters, FIGS. 11a-11b show part of a room that is similar to that shown in FIG. 1, but with a flat-screen television T7 (shown in dashed lines) movably mounted on the wall W in accordance with the principles of the present invention. More specifically, a generally U-shaped television bracket 601 is configured to span the television T7, and is attached across the back thereof (using bolts or other suitable means) in such a manner that left and right bracket tabs project forward across respective sides thereof. Left and right support arms 605 have first ends that are pivotally connected to respective tabs on the television bracket 601. Opposite, second ends of the support arms 605 are pivotally connected to respective second brackets or wall brackets 602 (which alternatively could be integral portions of a single part). The wall brackets 602 are secured to the wall W by screws or other conventional means.

In FIG. 11a, the line of sight L1 extends horizontally and unobstructed from the eyes of the seated person P to an upper portion of the fireplace F, and the line of sight L2 extends from the eyes of the seated person P toward the approximate center of the television T7 (at angle A relative to line L1). The support arms 605 are rotated approximately 180 degrees relative to the wall brackets 602, and the television T7 is rotated approximately 180 degrees relative to the support arms 605, to move the television T7 from the position shown in FIG. 11a to the position shown in FIG. 11b. The support arms 605 are preferably configured and arranged to remain clear of the mantle M.

In FIG. 11b, the line of sight L1 extends horizontally and unobstructed from the eyes of the seated person P to the approximate center of the television T7. In both the FIG. 11a position and the FIG. 11b position, the weight of the television T7 encourages the television T7 to remain as shown in those figures. Left and right cables 621 and 622 are interconnected between respective pulleys 631 and 632 and respective upper, rearward corners of the television T7 (using looped ends and bolts, for example). An intermediate portion of each cable 621 and 622 is routed through a respective guide 625 that is anchored to the wall W. Each guide 625 is depicted as an eyelet, but may take other forms, including a swiveling pulley, for example.

Figure 12:
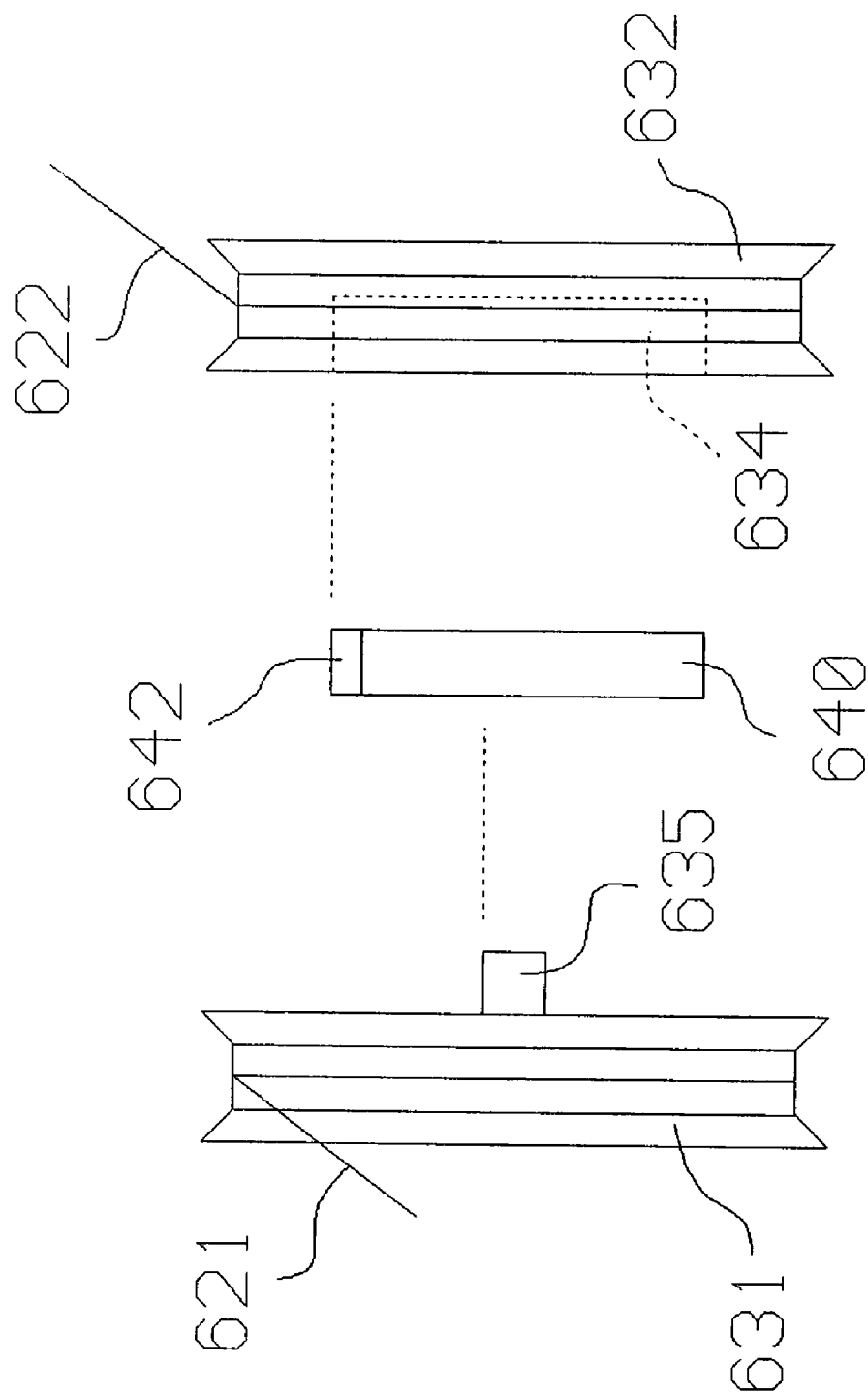
FIG. 12 is an exploded side view of a pulley assembly that is part of the television mounting arrangement of FIGS. 11a-11b.

The pulleys 631 and 632 are rotatably mounted on the wall W at rotational axis S. As shown in FIG. 12, a spiral coil spring 640 (preferably configured like a conventional lawn mower recoil spring) is interconnected between the pulleys 631 and 632. The spring 640 nests inside a cylindrical cavity 634 in the pulley 632, and an outer end 642 of the spring 640 is anchored to the pulley 632 in a conventional manner. Also, a hub 635 on the pulley 631 inserts into a central opening defined by the spring 640, and an inner end of the spring 640 is anchored to the hub 635 in conventional manner. The spring 640 is preferably placed in tension during manufacture or installation, in order to establish a preload force approximately equal to the weight of the television T7. For example, this preload may be accomplished by winding the pulleys 631 and 632 in opposite, spring stretching directions, and then inserting a temporary locking pin through aligned holes in the two pulleys 631 and 632. The pin remains in place until installation is completed, so that the television T7 resists withdrawal of the cables 621 and 622 onto the pulleys. Not only does the resulting arrangement resist pivoting of the support arms 605 from the FIG. 11a position to the FIG. 11b position, and assist pivoting of the support arms 605 from the FIG. 11b position to the FIG. 11a position, but it also tends to maintain the television T7 in an upright orientation during transitions between those two positions.

On an alternative embodiment, a back plate is provided to integrally connected all the anchor points associated with the wall W. In other words, the wall brackets 602, the guides 625, and the pulleys 631 and 632 are all connected to a common back plate, thereby ensuring both proper location of the components and structural integrity of the system.

The subject invention may also be described in terms of various methods that may be performed using one or more of the foregoing embodiments. For example, the present invention provides a method of moving a television from an elevated position to a preferred viewing position relative to a fireplace, comprising the steps of movably mounting the television on a wall for selective relocation relative thereto; and selectively relocating the television between the elevated position, wherein the television is disposed above the fireplace, and the preferred viewing position, wherein the television is disposed in front of at least part of the fireplace.

The present invention has been described with reference to specific embodiments and a particular application, but persons skilled in the art will recognize that the present invention may be practiced in other ways that nonetheless incorporate the essence of the present invention. For example, features of various depicted embodiments may be mixed and matched to arrive at additional embodiments and/or methods. Moreover, equivalent structures and/or method steps may be substituted for those disclosed herein. Thus, the scope of the present invention is to be limited only to the extent of the following claims.

What is claimed is:

1. A method of selectively moving a flat-screen television between two desired positions, namely, an elevated storage position above a fireplace, thereby accommodating conventional viewing and enjoyment of the fireplace, and a relatively lower, preferred viewing position in front of at least part of the fireplace, thereby accommodating conventional viewing and enjoyment of the television at a preferred viewing angle, comprising the steps of:

movably mounting the television on a wall for selective movement relative thereto; and without undoing the mounting step, selectively moving the television between the elevated position, wherein the television is disposed above the fireplace to accommodate conventional viewing and enjoyment of the fireplace, and the relatively lower, preferred viewing position, wherein the television is disposed in front of at least part of the fireplace to accommodate conventional viewing and enjoyment of the television at a preferred viewing angle, wherein the moving step involves positioning at least one-half of the television beneath a mantle disposed above the fireplace.

2. The method of claim 1, wherein the mounting step comprises the steps of: attaching a first bracket to the television; attaching a second bracket to the wall; and movably interconnecting the first bracket and the second bracket.

3. The method of claim 2, wherein the interconnecting step involves connecting a first end of a support arm to the second bracket for pivoting about a first axis, and connecting the first bracket to an opposite, second end of the support arm for pivoting about a second axis.

4. The method of claim 3, wherein the moving step includes rotating the support arm at least one hundred eighty degrees.

5. A television mounting arrangement, comprising:
a wall;
a fireplace disposed within the wall;
a flat-screen television;
a first bracket attached to the television;
a second bracket attached to the wall, wherein the first bracket is movably connected to the second bracket in a manner that accommodates movement of the television between a first position, disposed above the fireplace, and a second position, disposed in front of the fireplace, and the second bracket is part of a cabinet mounted on the wall, and sized and configured to entirely house and enclose the television, and when the television occupies the first position, the television is disposed above a lower edge of the cabinet and beneath an upper edge of the cabinet, and when the television occupies the second position, the television is disposed entirely beneath a lower edge of the cabinet.

6. The mounting arrangement of claim 5, wherein a first end of a support arm is connected to the second bracket for pivoting about a first axis, and the first bracket is connected to an opposite, second end of the support arm for pivoting about a second axis.

7. The mounting arrangement of claim 5, further comprising at least one bumper mounted on a side of the first bracket opposite the television, wherein said at least one bumper engages the wall when the television occupies said first position, and said at least one bumper engages the fireplace when the television occupies said second position.

8. A television mounting arrangement, comprising:
a wall;
a fireplace disposed within the wall;
a flat-screen television;
a first bracket attached to the television;
a second bracket attached to the wall, wherein the first bracket is movably connected to the second bracket in a manner that accommodates movement of the television between a first position, disposed above the fireplace, and a second position, disposed in front of the fireplace, wherein a horizontally extending mantle is mounted on the wall, and all of the television is disposed entirely above the top surface of the mantle when in said first position, and all of the television is disposed entirely beneath the top surface of the mantle when in said second position.

9. The mounting arrangement of claim 6, wherein the second pivot axis is disposed beneath an uppermost edge of the television.

10. The mounting arrangement of claim 6, wherein when the television occupies said first position, each said pivot axis is disposed beneath an uppermost edge of the television and above a lowermost edge of the television.

11. The mounting arrangement of claim 6, wherein the first pivot axis is vertically aligned with the second pivot axis with the television occupies said second position.

12. The method of claim 1, wherein a first end of a support arm is pivotally connected to the wall at a location above the fireplace, thereby defining a first pivot axis, and an opposite, second end of the support arm is pivotally connected to the television, thereby defining a second pivot axis, and the moving step involves rotating the second pivot axis up and over and beyond center relative to the first pivot axis.

13. The method of claim 1, wherein the television has a left side and a right side, and the mounting step constrains the left side and the right side to remain equidistant from the wall.

14. The method of claim 1, wherein the television is unstable in any position between the two desired positions.

15. The method of claim 1, wherein the moving step involves positioning the television entirely above the mantle to arrive at the elevated storage position, and entirely below the mantle to arrive at the preferred viewing position.

16. The method of claim 1, wherein the mounting step is performed relative to the wall entirely above the fireplace.

\* \* \* \* \*